United States Patent [19]
Morita et al.

[11] Patent Number: 5,292,418
[45] Date of Patent: Mar. 8, 1994

[54] LOCAL LASER PLATING APPARATUS

[75] Inventors: Takeshi Morita; Minoru Fujita; Masatoshi Sunamoto; Osamu Hayashi; Susumu Hoshinouchi, all of Amagasaki, Japan

[73] Assignee: Mitsubishi Denki Kabushiki Kaisha, Tokyo, Japan

[21] Appl. No.: 845,950

[22] Filed: Mar. 4, 1992

[30] Foreign Application Priority Data

Mar. 8, 1991 [JP] Japan ................................. 3-043427
Mar. 8, 1991 [JP] Japan ................................. 3-043428

[51] Int. Cl.[5] ....................... C25D 17/00; B05B 5/00; B05D 3/06
[52] U.S. Cl. ................. 204/224 R; 118/641; 427/597
[58] Field of Search ............... 204/224 R; 118/620, 118/641; 205/92; 427/596, 597

[56] References Cited

U.S. PATENT DOCUMENTS

| | | | |
|---|---|---|---|
| 4,497,692 | 2/1985 | Gelchinski et al. | 118/641 X |
| 4,511,595 | 4/1985 | Inoue | 118/641 X |
| 4,608,138 | 8/1986 | Kobayashi | 204/129.3 |
| 4,766,009 | 8/1988 | Imura et al. | 427/597 X |
| 4,826,583 | 5/1989 | Biernaux et al. | 204/224 R |
| 4,832,798 | 5/1989 | Cvijanovich et al. | 205/209 |

FOREIGN PATENT DOCUMENTS

| | | |
|---|---|---|
| 0128401 | 12/1984 | European Pat. Off. . |
| 261296 | 3/1988 | France . |
| 1797 | 1/1984 | Japan . |
| 45278 | 10/1985 | Japan . |
| 96097 | 5/1986 | Japan . |
| 124596 | 6/1986 | Japan . |
| 179893 | 8/1986 | Japan . |
| 22493 | 1/1990 | Japan . |

OTHER PUBLICATIONS

Gelchinski, M. H., et al, Electrochemical and Metallurgical Aspects of Laser-Enchanced jet Plating of Gold, vol. 132, No. 1 (1985).

*Primary Examiner*—Donald R. Valentine
*Attorney, Agent, or Firm*—Sughrue, Mion, Zinn, Macpeak and Seas

[57] ABSTRACT

A local plating apparatus includes a fiber, a laser beam penetrating nozzle or a laser beam penetrating mask through which a laser beam can be directly irradiated on a portion to be plated when plating is conducted on the portion to be plated using a jet of plating solution. The apparatus enables a laser beam to reach the portion to be plated in a stable state, and ensures a high plating speed and uniform plating quality.

5 Claims, 8 Drawing Sheets

LOCAL LASER PLATING APPARATUS

BACKGROUND OF THE INVENTION

1. Field of the Invention

The present invention relates to a local plating apparatus, and more particularly, to a local plating apparatus for forming by plating contacts or electrodes, such as bumps for connecting inner leads to a semiconductor chip in tape automated bonding (TAB), on part of a component of an electronic device.

2. Description of the Related Art

Figure 7:
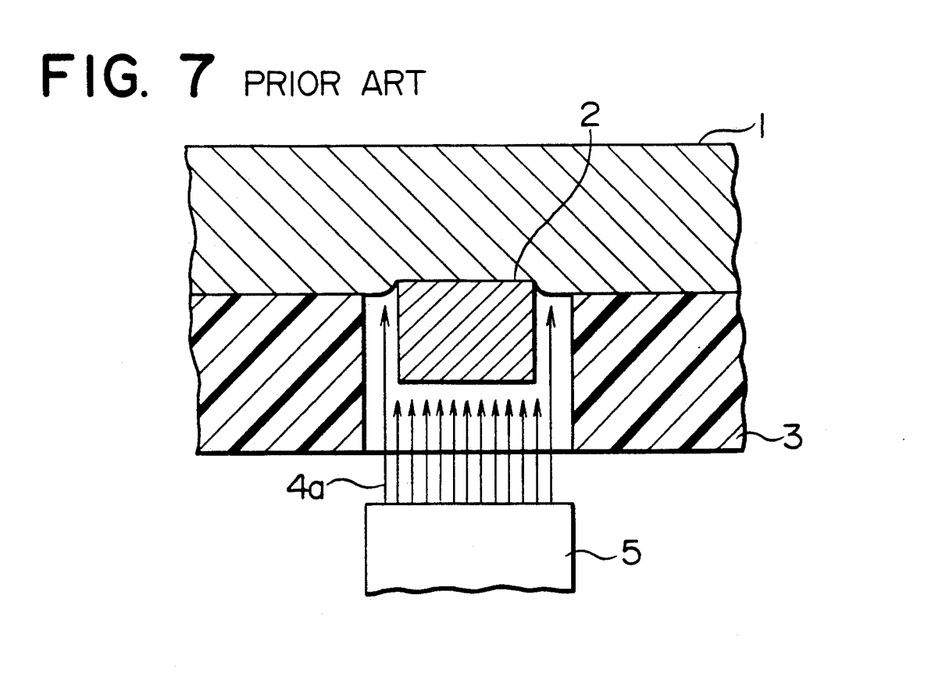
FIG. 7 is a schematic view of the essential parts of a conventional local plating apparatus.

FIG. 7 is a cross-sectional view illustrating a conventional local plating method of forming an electric terminal which is disclosed in, for example, Japanese Patent Publication No. 60-45278.

As can be seen in FIG. 7, a material 2 to be plated, such as an electric terminal, is provided on a cathode 1. A mask 3 is provided around the material 2 to be plated. A nozzle 5 for forming a jet 4a of plating solution is disposed in opposed relation to the material 2 to be plated.

In such a conventional jet type local plating technique, a jet 4a of plating solution is ejected to a desired site to be plated by application of a voltage between the cathode 1 and an anode (not shown). Therefore, a high-speed local plating can be performed without performing masking for each material 2 to be plated.

Figure 8:
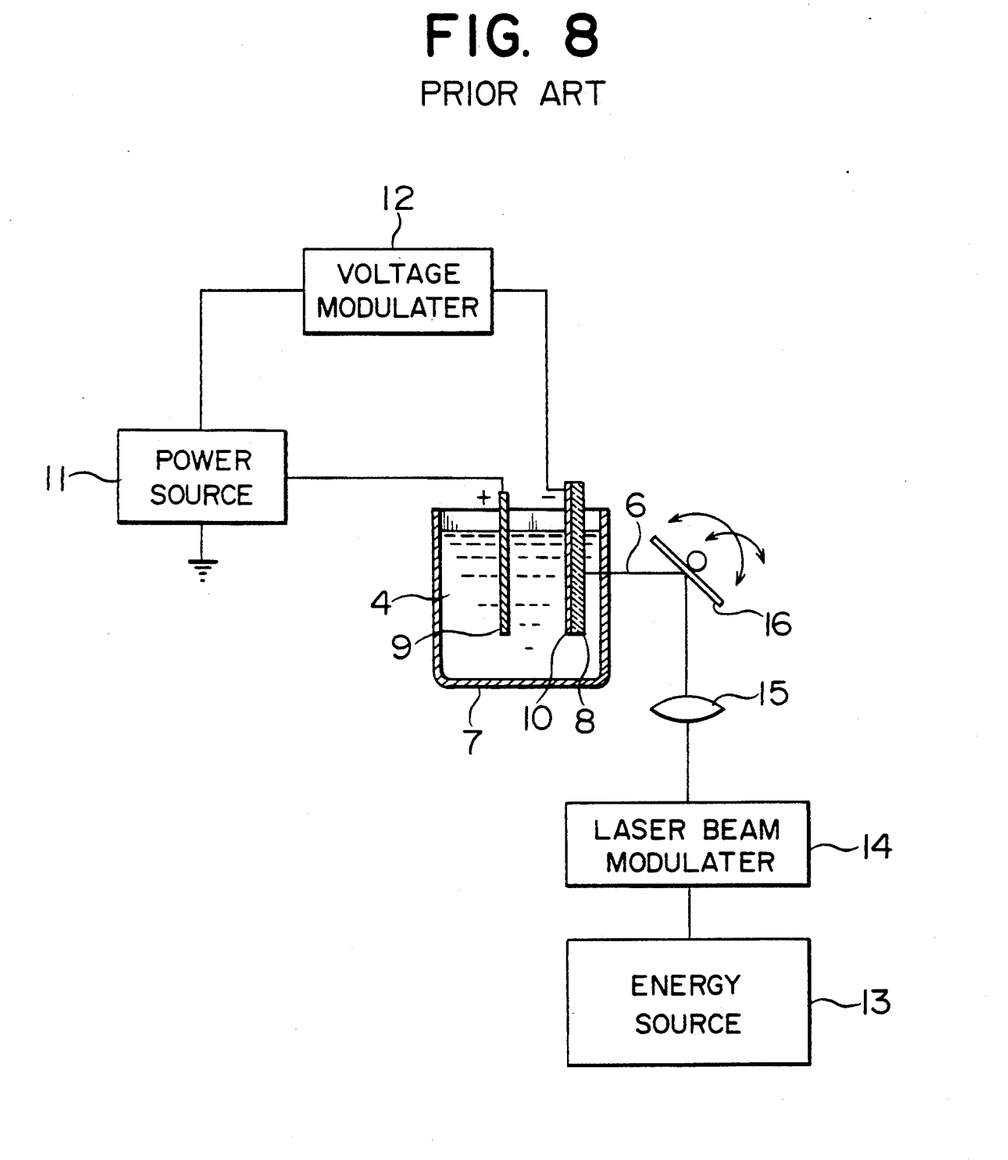
FIG. 8 is a schematic view of another conventional plating apparatus.

FIG. 8 illustrates a conventional laser-enhanced local plating method which is disclosed in, for example, Japanese Patent Publication No. 59-1797.

As shown in FIG. 8, a plating solution 4 is filled in a container 7 made of a material which passes through a laser beam 6, such as quartz. A material 8 to be plated which is made of glass, serving as a cathode, and an anode 9 are immersed in the plating solution 4 in such a manner that they oppose each other. The material 8 to be plated has a metal layer 10 formed on the surface thereof. The material 8 to be plated and the anode 9 are respectively connected to a power source 11 and a voltage modulater 12.

Outside of the container 7 are provided an energy source 13, such as a laser beam oscillator, a laser modulater 14, a lens 15 and a scanning mirror 16.

The laser beam 6 generated by the energy source 13 is passed through the laser modulater 14, and is then converged by the lens 15. After being positioned by the scanning mirror 16, the laser beam 6 passes through the container 7 and then reaches the material 8 to be plated. The laser beam 6 passes through the material 8 to be plated which is made of glass also, and is focused on the metal layer 10. The material 8 to be plated is charged to a negative polarity by the power source 11, by which electrolytic plating is conducted. At that time, since the metal layer 10 formed on the material 8 to be plated is locally heated to a high temperature by irradiation of the laser beam 6, the speed of plating is increased. Furthermore, fine local plating on the order of a micron is possible without performing masking on the material 8 to be plated.

In the aforementioned conventional jet type plating method which does not employ a laser, a particulate film is readily formed, and cracks are readily generated in an interface between the plated film and the material 2 to be plated. In the aforementioned conventional laser-enhanced plating method, although the position of the portion to be plated is determined by the scanning mirror 16, positioning accuracy of scanning is not high. Consequently, the laser beam 6 may be unfocused or the angle of incidence of the laser beam 6 relative to the metal layer 10 may be varied, thus varying the power density of the laser beam which irradiates the metal layer 10 or the laser absorption coefficient of the metal layer 10. These may generate variations in the quality of plating.

Figure 9:
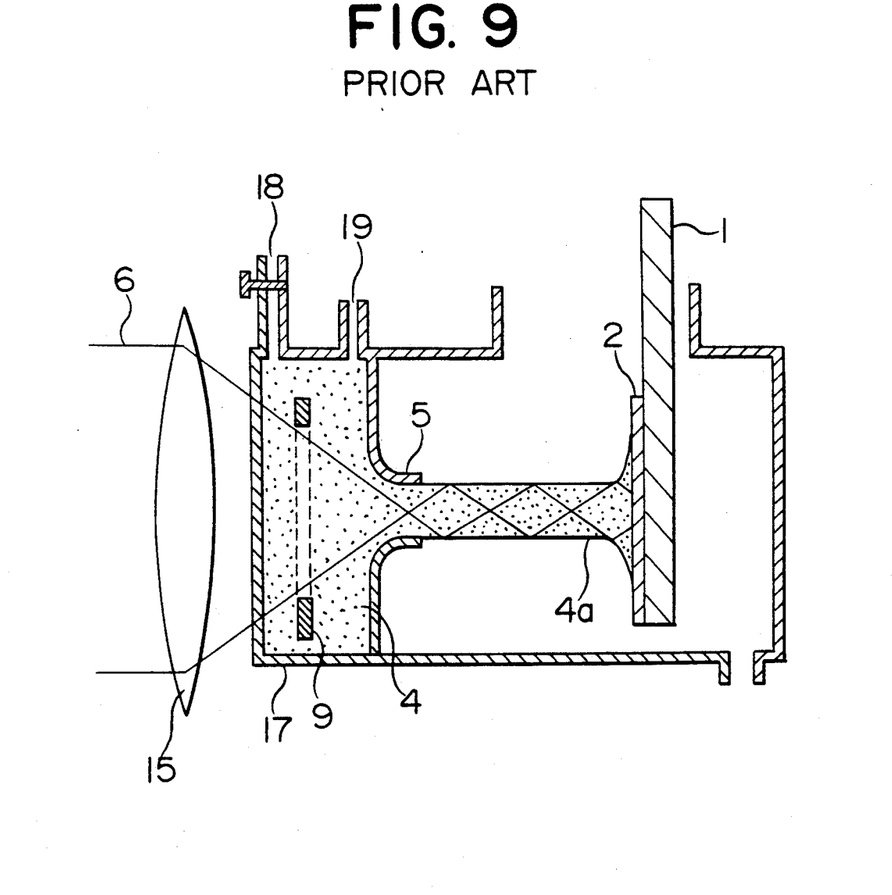
FIG. 9 is a schematic view of still another conventional plating apparatus.

A conventional laser-enhanced jet plating method proposed to improve the jet plating method will be described below. FIG. 9 is a cross-sectional view illustrating the conventional laser-enhanced jet plating method which has been proposed in "Electrochemical Science and Technology" by J. Electrochem. Soc. Vol. 132, from pp 575 to 2581 published in November 1985.

As shown in FIG. 9, a plating tank 17 having a nozzle 5 is made of quartz which passes through a laser beam 6. An anode 9 is provided in the plating tank 17. The plating tank 17 also has an air blender 18 and a plating solution feeding portion 19. Outside of the plating tank 17 is provided a lens 15 which focuses the laser beam 6 to the vicinity of the nozzle 5 in the plating solution 4.

In this method, the jet 4a of plating solution 4 is ejected to the portion to be plated by application of a voltage between the anode 9 and the cathode 1 while the laser beam 6 is focused into the plating solution 4. Due to a difference in the refractivity between the plating solution 4 and the ambient atmosphere, the irradiated laser beam 6 is totally reflected within the jet 4a and thereby reaches the portion of the material 2 to be plated. Since the material 2 to be plated which is irradiated with the laser beam 6 is partially heated to a high temperature, the speed of plating is increased, and a fine film can be plated.

In the aforementioned laser enhanced jet plating method, when the jet 4a is turbulent, total reflection of the laser beam 6 within the jet 4a does not occur, varying the laser output which reaches the portion to be plated. Consequently, variations in the plating quality are generated.

SUMMARY OF THE INVENTION

In view of the aforementioned problems of the conventional techniques, an object of the present invention is to provide a local plating apparatus which enables a laser beam to reach a portion to be plated in a stable state, and which assures a high plating speed and uniform plating quality.

To achieve the above object, the present invention provides a local plating apparatus which comprises a material on which plating is conducted, a nozzle for applying a jet of plating solution to a portion of the material on which plating is conducted, laser beam generation means for generating a laser beam, and a fiber for introducing the laser beam generated by the laser beam generation means to the vicinity of the portion to be plated to directly irradiate the same with the laser beam.

The present invention further provides a local plating apparatus which comprises a material on which plating is conducted, laser beam generation means for generating a laser beam, and a laser beam penetrating nozzle for applying a jet of plating solution to a portion of the material on which plating is conducted and for transmitting the laser beam generated by the laser beam generation means by total reflection within a wall portion thereof to directly irradiate the portion to be plated with the laser beam.

The present invention further provides a local plating apparatus which comprises a material on which plating is conducted, a nozzle for applying a jet of plating solution to a portion of the material to be plated, laser beam generation means for generating a laser beam, and a laser beam penetrating mask for transmitting the laser beam generated by the laser beam generation means by total reflection within a wall portion thereof to directly irradiate the portion to be plated with the laser beam, the laser beam penetrating mask being disposed on the surface of the material to be plated such that it covers a portion of the material other than the portion to be plated.

The present invention further provides a local plating apparatus which comprises a material on which plating is conducted, a nozzle for applying a jet of plating solution to a portion of the material on which plating is conducted, laser beam generation means for generating a laser beam, and a mask disposed on the rear surface of the material to be plated and having an opening through which the laser beam generated by the laser beam generation means is transmitted by being reflected by an inner peripheral surface of the opening so as to irradiate the transmitted laser beam onto the rear surface of the portion to be plated.

DETAILED DESCRIPTION OF THE PREFERRED EMBODIMENTS

Embodiments of the present invention will be described below with reference to the accompanying drawings.

First Embodiment

Figure 1:
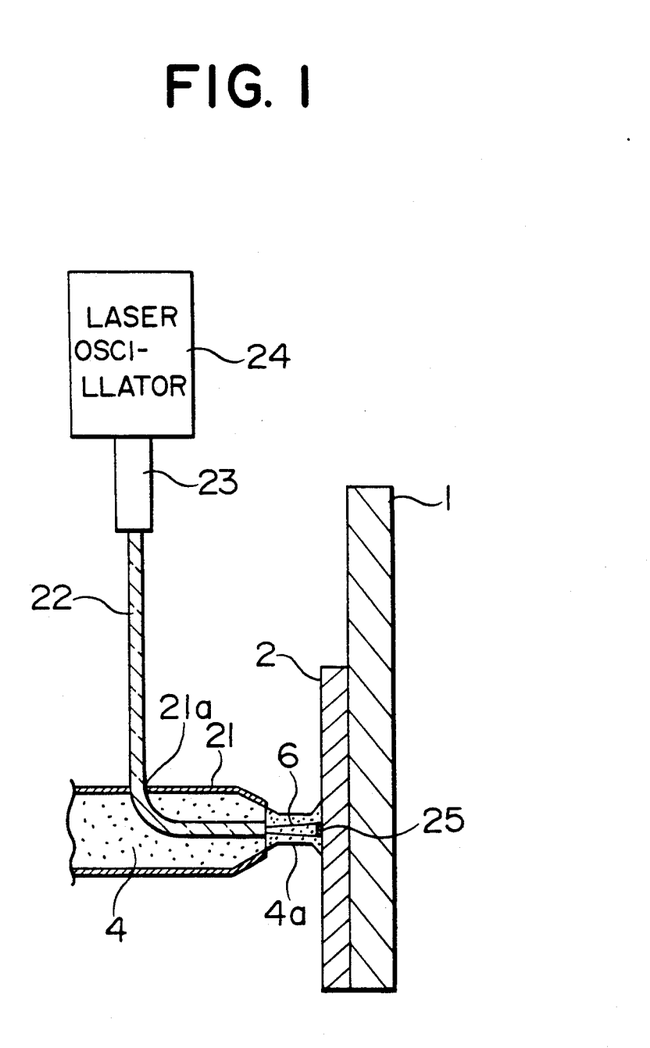
FIG. 1 is a schematic view of a first embodiment of a local plating apparatus according to the present invention.

FIG. 1 is a schematic view of a first embodiment of a local plating apparatus according to the present invention. In FIG. 1, the same or corresponding parts as those shown in FIGS. 7 through 9 are denoted by the same reference numerals.

As shown in FIG. 1, a nozzle 21 disposed in opposed relation to the material 2 to be plated has a fiber introducing port 21a. A fiber 22 is introduced into the nozzle 21 from this fiber introducing port 21a. The distal end portion of the fiber 22 is located at the distal end portion of the nozzle 21. The proximal end portion of the fiber 22 is connected to a laser beam oscillator 24 through a laser beam injecting optical system 23.

In the local plating apparatus arranged in the manner described above, a voltage is applied between the cathode 1 and the anode (not shown) such that a current can flow in the jet 4a, by which the plating solution 4 is ejected to a portion of the material to be plated 2 from the distal end portion of the nozzle 21. The laser beam 6 generated by the laser beam oscillator 24 is made incident on the fiber 22 by the laser beam injecting optical system 23 in such a manner that it is totally reflected within the fiber 22. The laser beam 6 incident on the fiber 22 is transmitted within the fiber 22 and then irradiated on a portion 25 being plated concurrently with ejection of the plating solution 4, at a time which is delayed by a given time from ejection of the plating solution 4 or intermittently. Consequently, the speed of plating is increased, and a fine film can be plated.

In this local plating apparatus, it is not necessary for the laser beam 6 to be totally reflected in the jet 4a. The laser beam 6 is irradiated directly on the portion to be plated from the distal end portion of the fiber 22. Therefore, even when the jet 4a is irregular, the output of the laser beam 6 which reaches the portion to be plated is stable, and variations in the plating quality can thus be reduced.

A fundamental harmonic and secondary higher harmonic of a YAG laser or an argon ion laser can be used as the laser beam 6. The oscillation output is between 20 W and 40 W. The oscillation time may be one or two seconds in the case of continuous waves, or two or three seconds in the case of pulses. Cyan type gold plating solution can be used as the plating solution 4. The proportion of gold in the plating solution is 12 g/liter. The current density of plating is between 8 $A/cm^2$ and 15 $A/cm^2$. The distance between the distal end portion of the nozzle 21 and the material 2 to be plated is between 1 mm and 5 mm. Since the laser beam 6 irradiated from the fiber 22 has a divergent angle, a small distance ensures a metal plated portion 25 having a small diameter. For example, when the distance is 1 mm, the diameter and thickness of the metal plated portion 25 are respectively 1.03 mm and between 15 $\mu$m and 35 $\mu$m.

In this embodiment, the fiber 22 is disposed at the center of the nozzle 21, and the distal end portion of the nozzle 21 is narrowed so as to allow the plating solution 4 to be directed to the center of the jet 4a as well and thereby prevent generation of a hollow portion in the jet 4a. Hence, the shape of the nozzle 21 must be changed in accordance with the position of the fiber 22 in the nozzle 21.

Second Embodiment

Figure 2:
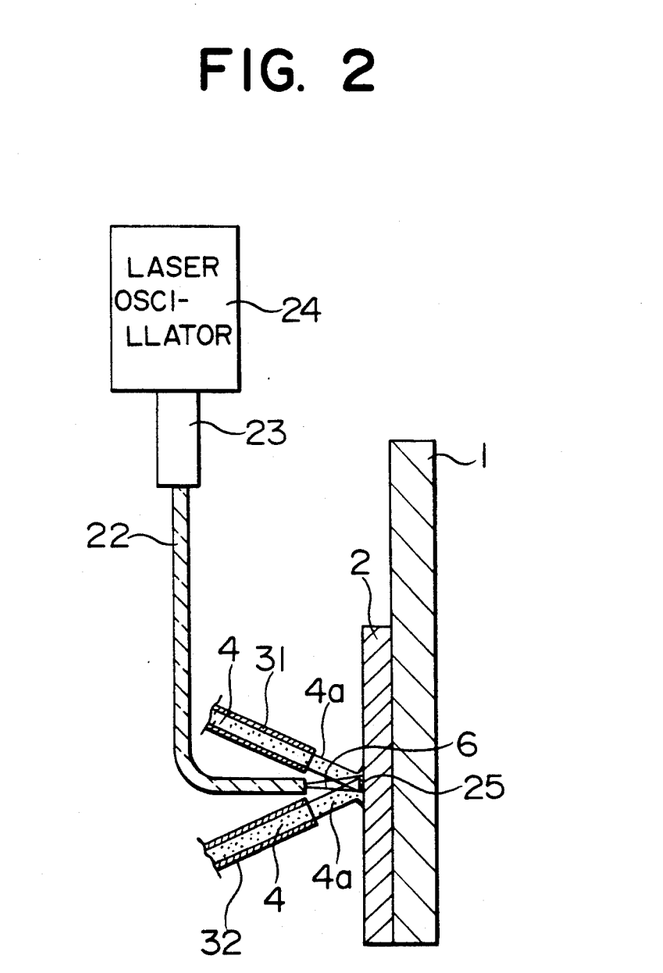
FIG. 2 is a schematic view of a second embodiment of the local plating apparatus according to the present invention.

FIG. 2 is a schematic view of a second embodiment of the local plating apparatus according to the present invention.

As shown in FIG. 2, the distal end portion of the fiber 22 through which the laser beam 6 is transmitted and irradiated on the portion to be plated is disposed perpendicular to the portion to be plated. Near the fiber 22, first and second nozzles 31 and 32 for applying the jet 4a of plating solution 4 to the portion to be plated are disposed at two sides of the fiber 22. The distal end portions of the first and second nozzles 31 and 32 are disposed at a certain angle relative to the portion to be plated. The fiber 22 and the nozzles 31 and 32 are each provided with a moving mechanism (not shown) for moving the same independently of each other.

In the local plating apparatus arranged in the manner described above, a voltage is applied between the cathode 1 and the anode (not shown) such that a current flows in the jet 4a, by which the plating solution 4 is ejected from the distal end portion of the nozzles 31 and 32 to the portion of the material 2 to be plated. At the same time, the laser beam 6 is irradiated directly to the portion to be plated from the distal end portion of the fiber 22. The type of laser, irradiation method, oscillation output and oscillation time are the same as those of the first embodiment. Also, the type of plating solution 4 and the current density of the plating are the same as those of the first embodiment.

In this embodiment, since the laser beam 6 is irradiated directly on the portion to be plated, as in the case of the first embodiment, the same advantages as those of the first embodiment can be obtained.

Furthermore, since the fiber 22 and the nozzles 31 and 32 can be moved independently of each other, the plating solution ejection conditions and the power density conditions for the laser beam 6 can be separately controlled.

Third Embodiment

Figure 3:
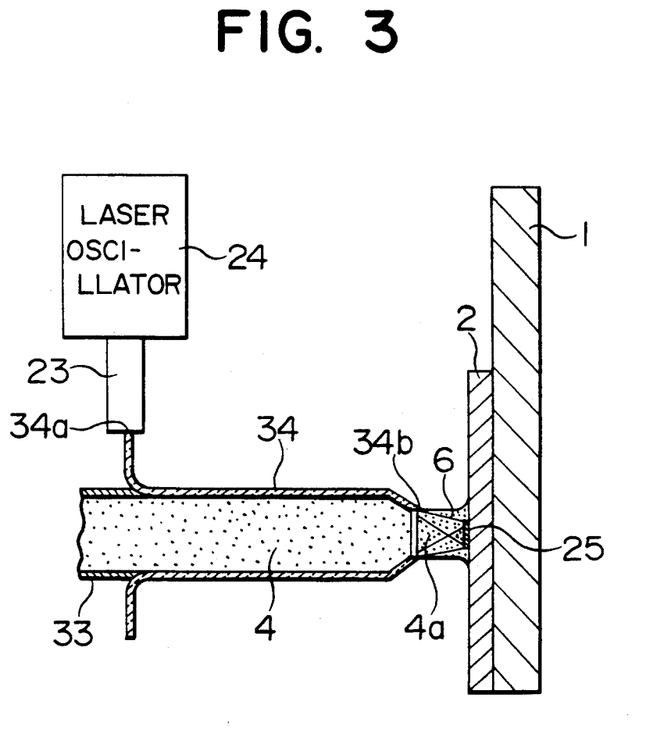
FIG. 3 is a schematic view of a third embodiment of the local plating apparatus according to the present invention.

FIG. 3 is a schematic view of a third embodiment of the local plating apparatus according to the present invention.

As shown in FIG. 3, a laser beam penetrating nozzle 34 for ejecting the jet 4a of plating solution 4 to the portion to be plated is connected to the distal end portion of a plating solution feeding tube 33. The plating solution feeding tube 33 is made of a material which does not pass the wavelength of the laser beam generated by the laser beam oscillator 24, such as sintered alumina. The laser beam penetrating nozzle 34 is made of a material which passes the laser beam 6 through it, such as melted quartz. A laser beam incident end surface 34a and a laser beam emerging end surface 34b of the laser beam penetrating nozzle 34 are made optically smooth relative to the laser beam 6. To enhance the laser bean transmission efficiency, gold plating may be conducted on the inner peripheral surface of the laser beam penetrating nozzle 34. Furthermore, the laser beam emerging end surface 34b is narrowed so as to allow the laser beam 6 to be converged on a single spot.

In the local plating apparatus arranged in the manner mentioned above, the voltage application method to the jet 4a, the plating solution ejection method, the type of laser beam 6, the type of plating solution 4 and the current density of plating are the same as those of the first embodiment. The laser beam 6 generated by the laser beam oscillator 24 is made incident on the laser beam incident end surface 34a provided at part of the end surface of the laser beam penetrating nozzle 34 by the laser beam injecting optical system 23. The incident laser beam 6 is totally reflected by the wall of the laser beam penetrating nozzle 34 and is thereby transmitted within the wall portion of the laser beam penetrating nozzle 34, and then emerges from the laser beam emerging end surface 34b which is the other end surface of the laser beam penetrating nozzle 34.

In this embodiment, the laser beam 6 is transmitted within the wall portion of the laser beam penetrating nozzle 34 and is irradiated directly on the portion to be plated without being totally reflected in the plating solution 4. Consequently, the same advantages as those of the first embodiment can be obtained.

In the third embodiment, the laser beam transmission efficiency is lower than the case which employs the fiber. Hence, the laser oscillation output level or the laser oscillation time must be increased by 20 to 30% than that in the first embodiment.

Fourth Embodiment

Figure 4:
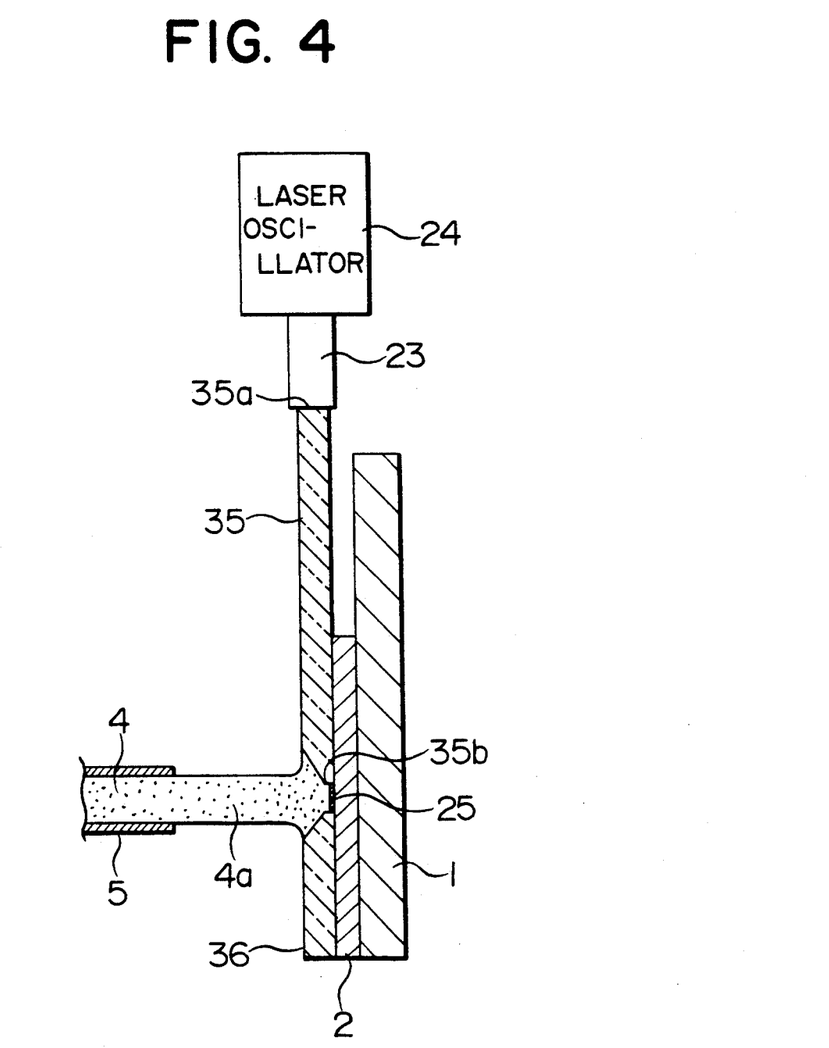
FIG. 4 is a schematic view of a fourth embodiment of the local plating apparatus according to the present invention.

FIG. 4 is a schematic view of a fourth embodiment of the local plating apparatus according to the present invention.

As shown in FIG. 4, laser penetrating masks 35 and 36, made of a material which passes the laser beam 6 through it, such as melted quartz, are provided around the portion of the material 2 to be plated so as to locally cover the material 2 to be plated.

In the local plating apparatus arranged in the manner mentioned above, the voltage application method to the jet 4a, the jet 4a ejecting method, the type of laser beam 6, the type of plating solution 4 and the current density of plating are the same as those of the first embodiment. The laser beam 6 generated by the laser beam oscillator 24 is made incident on an incident end surface 35a provided at one of the end surfaces of the laser penetrating mask 35 by the laser beam injecting optical system 23. The incident laser beam 6 is totally reflected and is thereby transmitted within the laser beam penetrating mask 35, and emerges from the emerging end surface 35b which is the other end surface.

In this embodiment, the laser beam 6 is transmitted within the laser beam penetrating mask 35 and is irradiated directly on the portion to be plated without being totally reflected in the plating solution 4. Consequently, the same advantages as those of the first embodiment can be obtained.

In the fourth embodiment, the laser beam transmission efficiency is lower than the case which employs the fiber. Hence, the laser oscillation output level or the laser oscillation time must be increased by 30 to 40% than that in the first embodiment in accordance with the width of the laser beam penetrating mask 35.

In either of the aforementioned embodiments, there is no limitation to the number or shape of nozzles or fibers.

Fifth Embodiment

Figure 5:
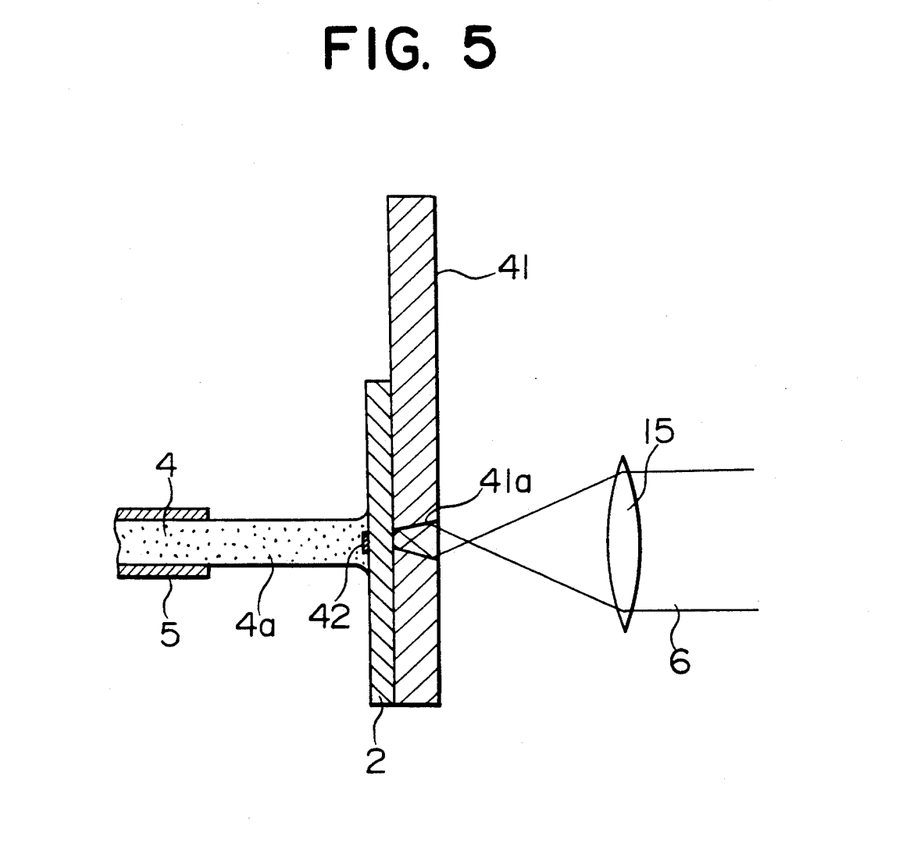
FIG. 5 is a schematic view of a fifth embodiment of the local plating apparatus according to the present invention.

FIG. 5 is a schematic view of a fifth embodiment of the local plating apparatus according to the present invention.

As shown in FIG. 5, the material 2 to be plated is made of copper or phosphor bronze. The rear surface of the material 2 is in contact with a mask 41 made of a metal, such as stainless steel or molybdenum. The mask 41 is connected to a power source (not shown) to form a cathode. The mask 41 has an opening 41a whose inner peripheral surface is polished smooth so as to facilitate reflection of the laser beam 6 and whose diameter is larger at the laser beam incident side than at the laser beam emerging side (the side of the opening which is in contact with the material 2 to be plated). The lens 15 is disposed in opposed relation to the opening 41a. The nozzle 5 for forming the jet 4a of plating solution 4 opposes the surface of the material 2 to be plated.

In the local plating apparatus arranged in the aforementioned manner, a voltage is applied between the mask 41 and the anode (not shown) such that a current can flow in the jet 4a, by which the plating solution 4 is ejected to the portion of the material 2 to be plated from the distal end portion of the nozzle 5. The laser beam 6 is converged by the lens 15 such that most of the energy thereof is located within the opening 41a, i.e., it has a diameter which is smaller than that of the opening 41a, and is then irradiated onto the interior of the opening 41a concurrently with ejection of the plating solution 4, at a time which is delayed by a given time from the ejection of the plating solution 4 or intermittently. At that time, since the laser beam 6 has a divergent angle, it is reflected by the inner peripheral surface of the opening 41a a plurality of times before it reaches the rear surface of the material 2 to be plated. Consequently, the power density of the laser beam 6 is uniform, and the rear surface of the material 2 to be plated can thus be heated uniformly without being thermally damaged. As a result, the plating quality can be improved uniformly.

The mask 41 used in this embodiment has a thickness of 5 mm. The diameter of the opening 41a is 1 mm at its laser beam incident side and 50 $\mu$m at its laser beam emerging side. A fundamental harmonic and secondary higher harmonic of a YAG laser or an argon ion laser can be used as the laser beam 6. The oscillation output is between 5 W and 10 W. The oscillation time is one or two seconds in the case of continuous waves, or two or three seconds in the case of pulses. As the plating solution 4, cyan type neutral gold plating solution can be used. The proportion of gold in the plating solution is 12 g/liter. The current density of plating is between 8 A/cm$^2$ and 15 A/cm$^2$. The distance between the distal end portion of the nozzle 5 and the material 2 to be plated is between 1 mm and 5 mm. For example, when the distance is 1 mm, the diameter of and thickness of the a metal plated portion 42 are respectively 200 $\mu$m and between 5 $\mu$m and 20 $\mu$m.

Sixth Embodiment

Figure 6:
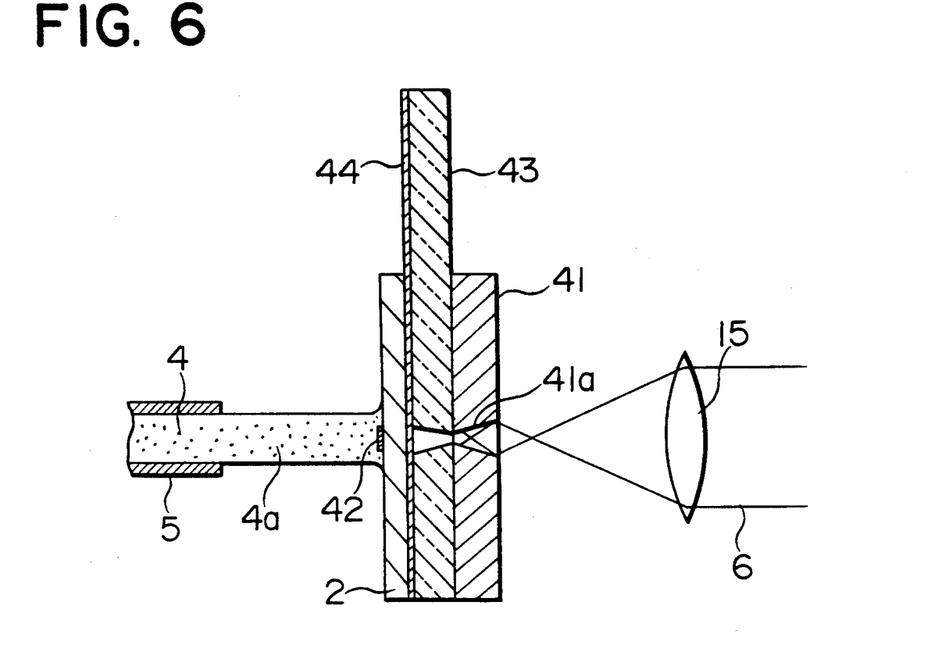
FIG. 6 is a schematic view of a sixth embodiment of the local plating apparatus according to the present invention.

FIG. 6 is a schematic view of a local plating apparatus according to the present invention.

As shown in FIG. 6, on one of the surfaces of a laser beam penetrating member 43 made of a material having a lower heat conductivity than metal, such as melted quartz, is deposited a cathode 44 which is a thin film of a metal, such as molybdenum or gold, by vacuum deposition or plating. The cathode 44 is in contact with the rear surface of the material 2 to be plated. The other surface of the laser beam penetrating member 43 is in contact with the mask 41 which is similar to that used in the fifth embodiment shown in FIG. 5.

In the local plating apparatus arranged in the aforementioned manner, a voltage is applied between the cathode 44 and the anode (not shown) such that a current flows in the jet 4a, by which the plating liquid 4 is ejected to the portion of the material 2 to be plated from the distal end portion of the nozzle 5. The laser beam 6 irradiated to the opening 41a of the mask 41 in the same manner as that of the fifth embodiment is reflected by the inner peripheral surface of the opening 41a a plurality of times before it reaches the laser beam penetrating member 43. The laser beam 6 propagates in the laser beam penetrating member 43 while diverging at a predetermined divergent angle and then reaches the cathode 44. The laser beam 6 reaching the cathode 44 heats the material 2 to be plated from the rear surface thereof.

In the sixth embodiment, the type of laser beam 6, the irradiating method, the oscillating output and oscillating time are the same as those of the fifth embodiment. Also, the shape of the mask 41, the type of plating solution 4 and the current density of the plating are the same as those of the fifth embodiment. However, since the cathode 44 is provided separately from the mask 41, if the laser beam 6 can be reflected by the inner peripheral surface of the opening 41a, the material of the mask 41 is not limited to a conductive one.

In the sixth embodiment, since the power density of the laser beam 6 can be made uniform by reflection in the opening 41a, as in the case of the fifth embodiment, the material 2 to be plated can be heated uniformly, and the plating quality can thus be improved uniformly.

In the fifth embodiment, since the mask 41 made of a metal so that it can also serve as a cathode is in direct contact with the rear surface of the material 2 to be plated, part of the heat applied by the laser beam 6 may escape to the mask 41. However, in the sixth embodiment, the cathode 44 which is the thin metal film formed on the laser beam penetrating member 43 having a low heat conductivity is in direct contact with the material 2 to be plated. Therefore, loss of heat conducted by the laser beam 6 is less, and the material 2 to be plated can thus be heated efficiently.

In the fifth and sixth embodiments, electrolytic plating has been described. However, the present invention can also be applied to electroless plating. In the case of electroless plating, if the opening 41a is coated with a laser beam reflecting film, ceramics or resins can be used as the material of the mask.

What is claimed is:

1. An apparatus for locally plating a material, said apparatus comprising:
   a plurality of convergingly oriented nozzles for individually applying jets of plating solution to a site on said material to be plated such that the jets converge at the site;
   laser beam generation means for generating a laser beam; and
   an optical fiber for introducing the laser beam generated by said laser beam generation means to a vicinity of the site to be plated to directly irradiate the vicinity of the site with the laser beam, wherein the optical fiber is disposed exteriorly of said nozzles with a beam exit end thereof positioned proximate and perpendicular to the material such that the laser beam can irradiate said site independently of said nozzles.

2. An apparatus for locally plating a material, said apparatus comprising:
   laser beam generation means for generating a laser beam; and
   a laser beam penetrating nozzle for applying a jet of plating solution to a portion of said material on which plating is conducted and for transmitting the laser beam generated by said laser beam generation means by total reflection within a wall portion thereof to directly irradiate the portion to be plated with the laser beam.

3. An apparatus for locally plating a material, said apparatus comprising:
   a nozzle for applying a jet of plating solution to a portion of said material to be plated;
   laser beam generation means for generating a laser beam; and
   a laser beam penetrating mask for transmitting the laser beam generated by said laser beam generation means by total reflection within a wall portion thereof to directly irradiate the portion to be plated with the laser beam, said laser beam penetrating mask being disposed on a surface of the material to be plated such that it covers a portion of said material other than the portion to be plated.

4. An apparatus for locally plating a material, said apparatus comprising:
   a nozzle for applying a jet of plating solution to a portion of said material to be plated;
   laser beam generation means for generating a laser beam; and
   a mask disposed on a rear surface of the material to be plated and having an opening through which the laser beam generated by said laser beam generating means is transmitted by being reflected by an inner peripheral surface of said opening so as to irradiate the transmitted laser beam onto the rear surface of the portion to be plated.

5. A local plating apparatus according to claim 4 further comprising a thin film-like metal plate and a laser beam penetrating member having a low heat conductivity, said metal plate and said laser beam penetrating member being disposed between the material to be plated and said mask.

* * * * *